A. W. MORRIS.
SHAFT HANGER.
APPLICATION FILED DEC. 22, 1908.
1,025,289.
Patented May 7, 1912.
3 SHEETS—SHEET 3.
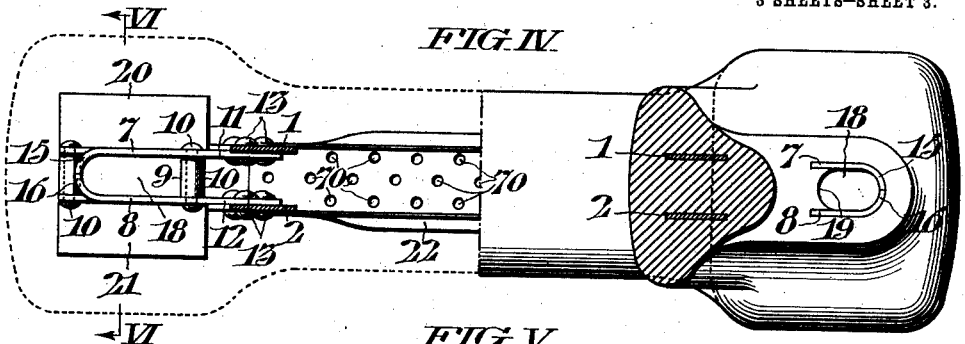
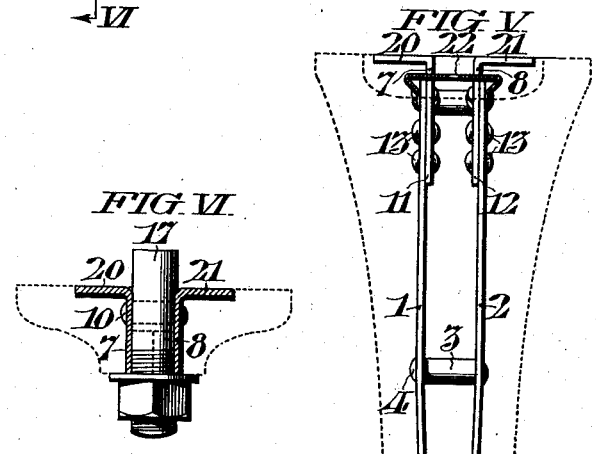
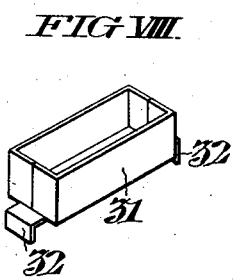
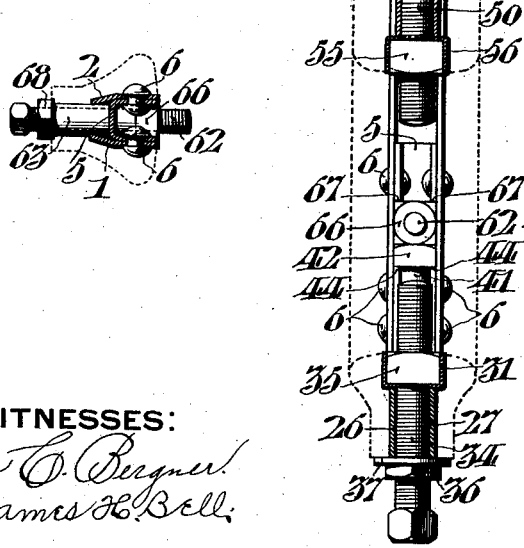
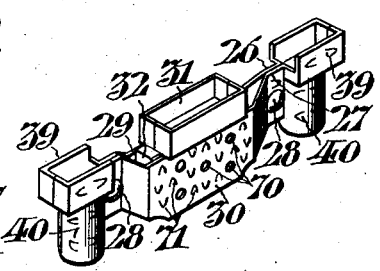
WITNESSES:
John C. Bergner
James H. Bell
INVENTOR:
ALBERT W. MORRIS,
By Haley & Paul
Attorneys.

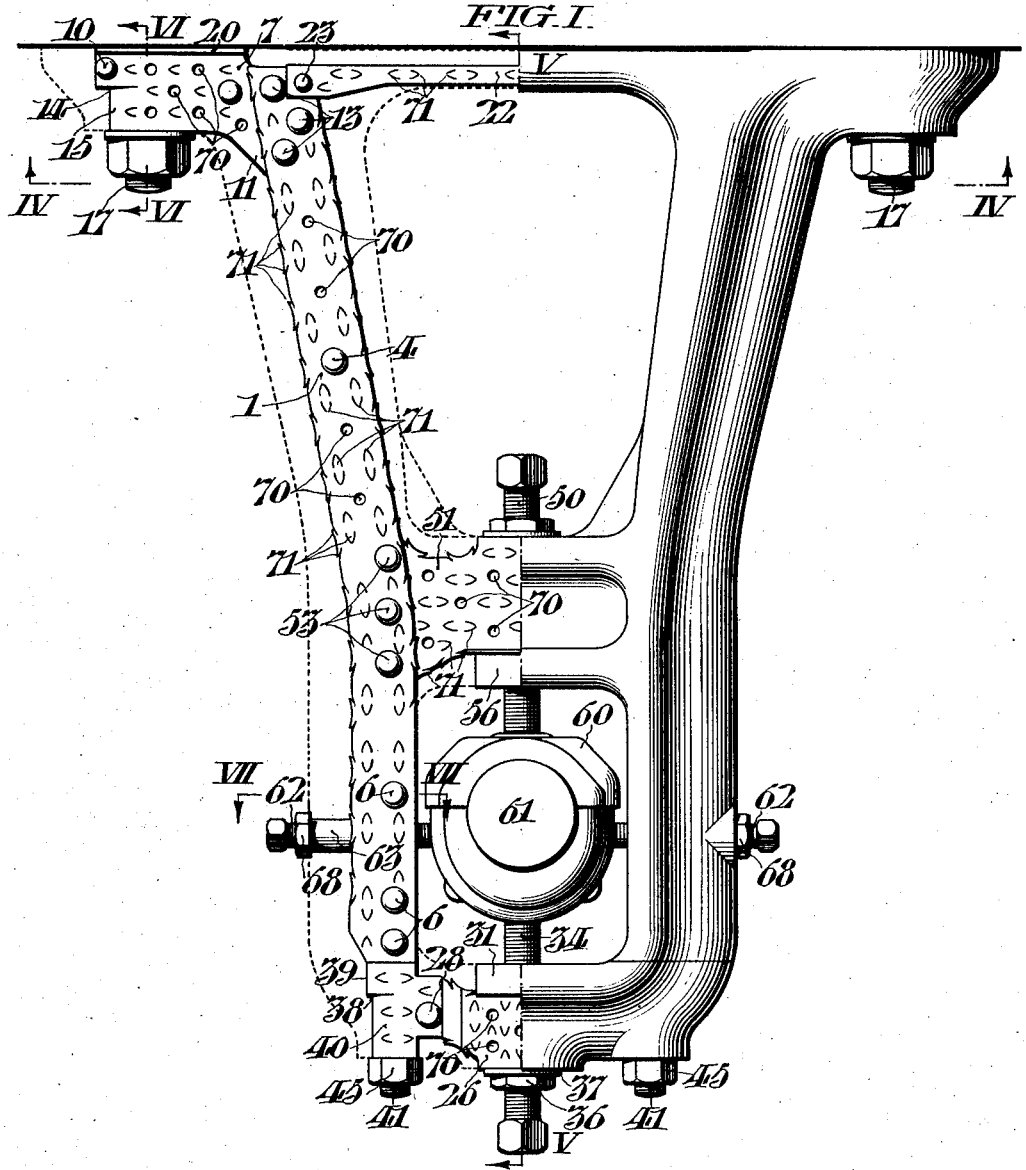

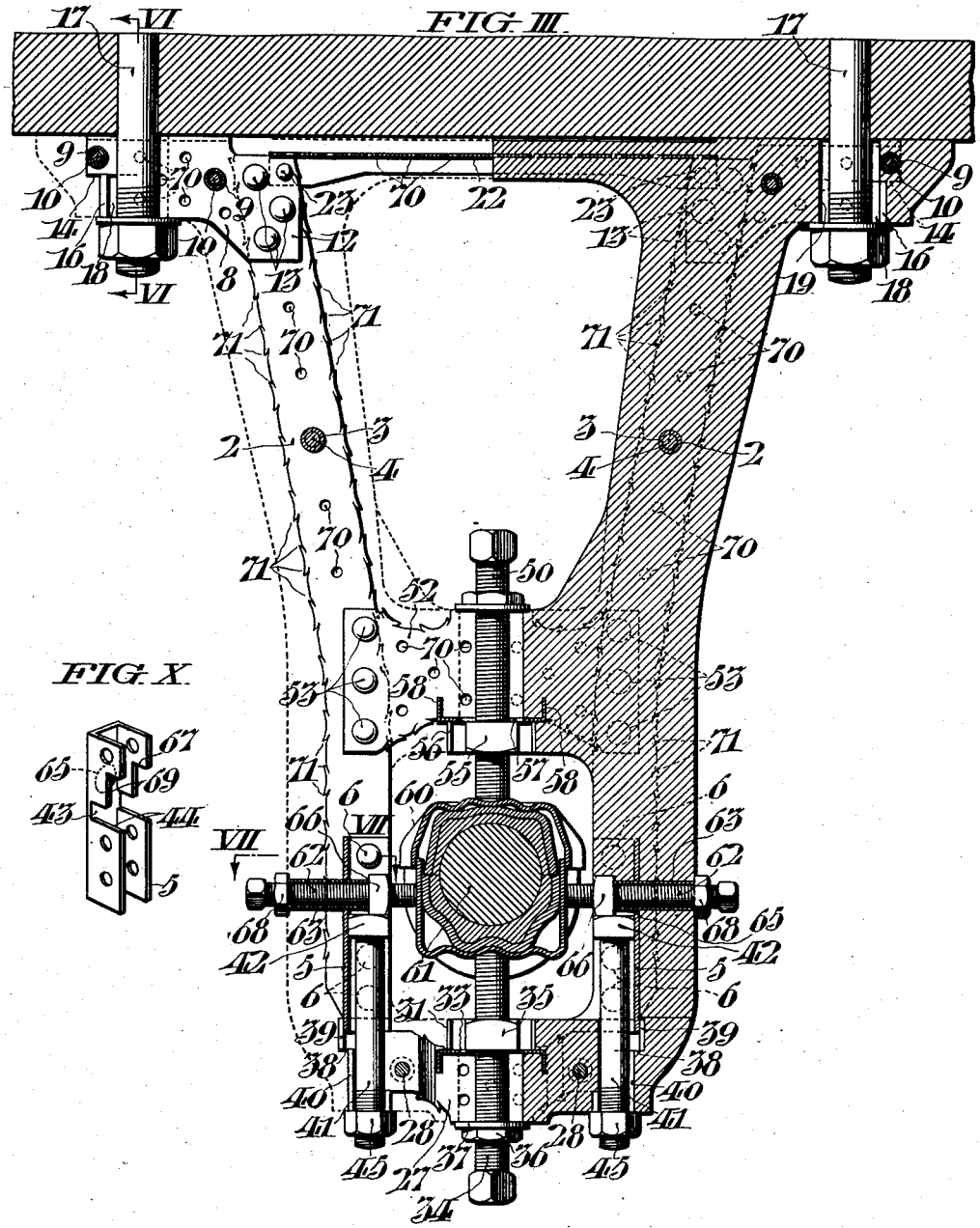
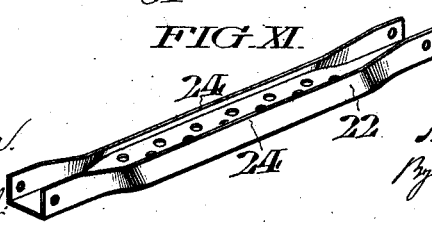

UNITED STATES PATENT OFFICE.

ALBERT W. MORRIS, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

SHAFT-HANGER.

1,025,289.

Specification of Letters Patent. Patented May 7, 1912.

Application filed December 22, 1908. Serial No. 468,721.

*To all whom it may concern:*

Be it known that I, ALBERT W. MORRIS, of Philadelphia, in the county of Philadelphia and State of Pennsylvania, have invented certain new and useful Improvements in Shaft-Hangers, whereof the following is a specification, reference being had to the accompanying drawings.

The object of my invention is to permit the construction of a composite shaft hanger, comprising a metallic framework, and a reinforce of rigid material capable of being applied in a plastic condition to said framework.

In its preferred embodiment, the framework is made of pressed steel, and the plastic component is concrete, or the like, but the invention is not restricted to these specific materials. Furthermore, in the preferred embodiment of the invention, the metallic framework is in the form of an internal skeleton, wholly enveloped by the reinforcing material, with the exception of portions of adjusting and connecting members to which access is necessary. The scope of the invention, however, is not restricted to this relative disposition of metallic parts, and reinforcing material, since it is obvious that the principle of construction does not depend upon the character of the external surface throughout, although some of the desiderata are better attained by the employment of the plastic reinforcing material for substantially the entire external surface. In using the term skeleton, therefore, throughout the following specification, it must be understood that I do not imply any restrictive meaning.

I will now proceed to describe a preferred embodiment of my invention, prominent characteristics of which are that the metallic skeleton is complete,—that is to say—it extends throughout the entire structure; that said skeleton is capable of bearing, by itself, all the extension stresses due to the conditions of use; and that the stresses directly incident to the uniting and adjusting of the parts of the structure, are substantially restricted to the metallic skeleton, so that the plastic component is relieved of those structural functions, for which it is not well adapted, while it contributes to the stability and integrity of the structure as a whole, thus permitting the use of a comparatively light skeleton, and, in the instance shown, affording a smooth external surface free from undesirable cavities or interstices.

In the description of the device shown in the accompanying drawings, I will, for convenience, first specify the metallic skeleton as a complete structure, without immediate reference to the reinforcing material, and it will be understood that after said skeleton has been set up and united to the extent to which it is intended to be permanently integral, the plastic material is applied (in this instance externally), by any desired method adapted for molding it, and that the external form, though following the general outline of the skeleton, may be modified as desired.

In the accompanying drawings, Figure I, is an elevation of a shaft hanger conveniently embodying my invention. The reinforcing material is omitted on the side to the left of the center of this figure, in order to show in elevation the metallic skeleton of the hanger. Fig. II, is an inverted plan view of the lower portion of the hanger. Fig. III, is a vertical longitudinal sectional view through the hanger. In this figure the reinforcing material is also omitted on the left of the center, thus showing a section through the metallic skeleton itself. Fig. IV, is a sectional plan view taken on the line IV, IV, in Fig. I. Fig. V, is a vertical cross-section taken on line V, V, in Fig. I. The bearing box and the reinforcing material are omitted in this figure, in order to clearly illustrate the construction of the metallic skeleton. The contour of the finished hanger is, however, shown by the dotted outline. Fig. VI, is a sectional view through the foot of the hanger, and indicated by the line VI, VI, in Figs. I, III, and IV. Fig. VII, is a cross section through one of the leg portions, as indicated on the line VII, VII, in Figs. I, and III. Fig. VIII, is a perspective view of one of the nut receiving boxes. Fig. IX, is a perspective view of the yoke which spans the lower ends of the leg portion of the metallic skeleton. Fig. X, is a perspective view of one of the spacing pieces. Fig. XI, is a perspective view (inverted), of the channel shaped brace, which spans the upper ends of the leg portion of the metallic skeleton.

By reference to said drawings, it will be seen that the skeleton comprises two legs, each formed of two sheet metal strips 1, and 2, shaped in the form of obtuse angles. Said strips 1, and 2, are spaced from each other by the spacers 3, whereby their inclined portions are maintained in parallel relation to each other and secured by means of rivets 4, which pass through said spacers 3, and are headed over on the outer faces of the said strips 1, and 2. The vertical lower portions of the said leg strips 1, and 2, are spaced by means of the channel shaped pieces 5, which are secured between the strips 1, and 2, by means of rivets 6. The lower ends of the channeled spacers 5, protrude a short distance below the lower ends of the leg strips.

The foot pieces of the skeleton each comprise a pair of strips arranged in vertical edgewise relation, and flat horizontal footplates. Said strips 7, and 8, are maintained in parallel relation to each other by means of spacers 9, and secured by rivets 10. The strips 7, and 8, are provided with offset enlarged flaps 11, and 12, which are respectively secured to the insides of the upper ends of the strips 1, and 2, by means of rivets 13. Each of said strips 7, and 8, is slit longitudinally for a short distance as indicated at 14, in Figs. I, and III, and the lower tongues 15, and 16, thus formed are bent inward in rounded form as shown in Fig. IV. These rounded ends 15, and 16, abut against each other, and form deep vertical metallic walls of U-shaped cross section inclosing slots 18, which receive the fastening bolts 17, by means of which the hanger is supported. The open side of each slot may be partly closed by the reinforcing material, as indicated at 19, in Figs. III, and IV. The strips 7, and 8, are also provided with the laterally extending wings 20, and 21, respectively, which form the foot plates, of the hanger.

A channel piece 22, subtends the upper extremities of the legs of the hanger and is secured to each pair of the strips 1, and 2, by means of rivets 23, which also pass through the strips 7, and 8. The said channel piece 22, is widened at its center portion, at which region its sides 24, are inwardly inclined, as shown in Figs. V, and XI, so as to afford an underhanging hold for the reinforcing material. At the relatively narrow ends of said channel piece 22, its inclined sides 24, become gradually vertical to fit snugly against the outside faces of the strips 1, and 2, as above stated.

The lower ends of the legs of the skeleton are connected by means of a yoke, which is made up of two similar stamped sheet metal pieces 26, and 27, secured by means of rivets 28, as shown in Fig. IX. Said yoke-pieces 26, and 27, are each offset outwardly at their central portions to form an open trough-shaped member with parallel sides 29, and 30, respectively, between which are received the depending flaps 32, formed on a rectangular box 31, which is adapted to rest upon the upper edges of the said parallel sides 29, and 30. The box 31, is stamped or pressed from a single piece of sheet metal and is provided in its bottom with a slot 33, (see Fig. III), which receives the shank of the vertical adjusting screw 34, having a squared nut 35, which fits snugly within said box 31, and is thereby prevented from rotation. Said screw 34, is also provided with a nut 36, which forces a washer 37, against the lower edges of the parallel sides 29, and 30, of the yoke pieces 26, and 27. By this arrangement, it will be seen that there is absolutely no compressive force exerted upon the reinforcing material which surrounds the yoke-pieces 26, and 27, the bearing surfaces and related elements in the direct lines of compression, being all of metal. The ends of said yoke pieces 26 and 27, are slit longitudinally, the portions above the slits being pressed in dies so that each shall constitute one-half of a rectangular trough 39, corresponding in width and length with the dimensions of the lower end of the leg strips 1 and 2, while the portions below the slits are bent so that each shall form one-half of an approximately cylindrical sleeve 40. The troughs 39, receive the protruding ends of the channeled spacers 5, which extend below the lower ends of the leg strips 1 and 2, while the edges of said lower ends abut directly against the upper edges of the troughs 39. The cylindrical sleeves 40, receive the bolts 41, by means of which the yoke piece is secured to the legs, the lower edges of said sleeves forming rigid abutments, which bear the thrust of the nuts 45, upon the bolts 41.

The squared heads 42, of the bolts 41, are received between the leg strips 1, and 2, the sides of the channel spacers 5, being recessed at that point as indicated at 43, in Fig. X. The said heads 42, of the bolts 41, rest upon the edges 44, of these recesses 43, in the channeled spacers 5, and by means of the nuts 45, and bolts 41, the yoke is secured to the legs of the hanger, in such manner that the upper edges of the troughs 39, are clamped against the ends of the leg strips 1, and 2, without any strain on the reinforcing material, lateral displacement of the yoke being prevented by the engagement of the protruding ends of the channeled spacers within the troughs.

An upper adjusting screw 50, for the bearing box, is supported in a cross-piece comprising the horizontal connecting plates 51, and 52, which are secured at their respective ends to the inner face of the strips 1, and 2, by means of rivets 53. The said adjusting screw 50, is provided with a squared nut 55, received within a box 56, similar in general construction to the box 31, hereinbefore described, being provided with a slot 57, and with the tongues 58. The box 56, is supported in an inverted position, its bottom being in contact with the lower edges of the plates 51, and 52, while its tongues 58, are received between said plates, the box being held in place by the reinforcing material, but all strains of thrust or torsion are borne by the plates 51, and 52.

By means of the screws 34, and 50, the bearing box 60, which carries the shaft 61, can be vertically adjusted. The details of this bearing box need not be stated herein, as the claims of the present application relate to the hanger itself, whose use is not restricted to any particular type of bearing box.

The horizontal adjustment of the bearing box 60, is permitted by the screws 62, which are supported within the sleeves 63. Said sleeves 63, are embedded in the reinforcing material, and extend through apertures 65, in the spacing channels 5, and are pinched between the inwardly converging edges of the strips 1, and 2, as best seen in Fig. VII.

The adjusting screws 62, are provided with squared nuts 66, whose width corresponds exactly to the distance between the strips 1, and 2, and they are therefore prevented from turning. The said nuts 66, rest between the heads 42 of the bolts 41, and the edges 67, of the channeled spacers 5, whose sides are cut away at that point to receive them. By means of the nuts 68, on screws 62, at the outer ends of the sleeves 63, the squared nuts 66, are drawn against the parallel edges 69, of the cuts in the spacers 5. Here again, the compressive and torsional stress is entirely exerted upon the metallic parts, so that danger of injury to the reinforced material is obviated.

As shown in the drawings the metallic skeleton is preferably entirely embedded within the reinforcing material, except those portions of the edges which are left exposed for the abutment of the several adjusting nuts. In order to afford numerous gripping holds for the reinforcing material, the metallic skeleton is provided with apertures 70, and also with barbs 71, along its faces and edges. The concrete, or like material, may be molded upon the metallic skeleton by any convenient process, and any external contour may be given thereto which is desired, it being preferable to follow somewhat closely the general shape of the skeleton and to avoid unnecessary recesses, in which dust, etc., might accumulate. The concrete not only reinforces the metallic structure, but permits the several parts of the latter to be employed in shapes most convenient for pressing out of metal, but which would be inappropriate if they were to constitute the external portions of the finished article. In fact the very roughness and irregularity of the external surface of the skeleton, which would be prohibitory in the absence of the concrete reinforcement, lends itself to the application and permanency of the latter. In the instance shown, the entire structure, with the exception of the yoke, is intended to be permanently integral, and hence the reinforcing material is applied to and molded upon the foot-piece legs and cross-piece in a continuous mass, terminating of course, at the lower ends of the legs in an edge or surface adapted to form a close joint with the corresponding edge of the reinforcing material separately molded upon the yoke. If desired, however, the yoke may be included as a permanently integral part, in which case the reinforcing material is continuous throughout the entire structure.

Having thus described my invention, I claim:—

1. A shaft hanger including in combination, a metal foot-piece, metal legs secured thereto, each consisting of a pair of flat substantially-parallel strips, spacers for holding said strips in spaced relation, a metal yoke connecting the lower end of said strips, said yoke being formed of metal strips, a cross-piece intermediate the yoke and the foot-piece, said cross-piece consisting of metal strips secured to the metal strips in the legs, and a reinforce of concrete inclosing the said foot-piece, the legs, the yoke, and the cross-piece.

2. In a shaft hanger, the combination of a metallic foot-piece; metallic legs secured thereto and each comprising a pair of flat parallel strips; intermediate metallic spacers having recesses adapted to retain polygonal nuts; a detachable metallic yoke connecting the lower ends of said strips, said yoke having a recess adapted to retain a polygonal nut; a cross piece secured to said legs and also provided with a recess adapted to retain a polygonal nut; screw bolts connecting said yoke with each of said legs; adjusting screws for the bearing box, mounted upon said legs, yoke and cross piece respectively; said adjusting screws being provided with polygonal nuts retained against rotation in said recesses and with thrust bearing elements wholly comprised within the respective metallic elements; and a reinforce of concrete applied to said metallic skeleton but isolated from direct engagement with said uniting and adjusting elements.

3. In a shaft hanger, the combination with legs; of a detachable yoke piece having a receptacle at its central portion adapted to retain a polygonal nut; said yoke piece having rectangular end portions adapted to embrace and abut against the lower extremities of said legs, and also comprising elongated vertical sleeves adapted to receive bolts and form thrust bearings therefor; uniting bolts for connecting said yoke piece to said leg plates; an adjusting screw having a nut seated in said receptacle, and a reinforce of concrete applied to said yoke and legs of the shaft hanger, but isolated from direct engagement with the adjusting screw, substantially as set forth.

In testimony whereof, I have hereunto signed my name, at Philadelphia, Pennsylvania, this twenty-first day of December, 1908.

ALBERT W. MORRIS.

Witnesses:
JAMES H. BELL,
E. L. FULLERTON.

Copies of this patent may be obtained for five cents each, by addressing the "Commissioner of Patents, Washington, D. C."